United States Patent [19]

Johnson et al.

[11] Patent Number: 5,224,898
[45] Date of Patent: Jul. 6, 1993

[54] CUSHION CONNECTOR

[75] Inventors: Clarence W. Johnson; Ilya Y. Mayzus, both of Calgary, Canada

[73] Assignee: Barber Industries Ltd., Calgary, Canada

[21] Appl. No.: 921,989

[22] Filed: Aug. 3, 1992

Related U.S. Application Data

[63] Continuation of Ser. No. 680,518, Apr. 4, 1991, abandoned.

[30] Foreign Application Priority Data

Jul. 6, 1990 [CA] Canada .................................. 2020623

[51] Int. Cl.⁵ .......................... E21B 17/07; F16D 3/03; F16D 3/68
[52] U.S. Cl. .......................................... 464/20; 464/74; 464/76; 464/83; 464/169; 175/321
[58] Field of Search .................... 464/20, 74, 73, 76, 464/83, 18, 21, 85, 162, 169; 175/321, 320, 323, 322

[56] References Cited

U.S. PATENT DOCUMENTS

| | | | |
|---|---|---|---|
| 1,860,744 | 5/1932 | Krobee | 464/83 X |
| 4,139,994 | 2/1979 | Alther | 464/20 |
| 4,844,181 | 7/1989 | Bassinger | 175/321 X |

FOREIGN PATENT DOCUMENTS

| | | | |
|---|---|---|---|
| 1179828 | 5/1959 | France | 464/74 |
| 215269 | 9/1941 | Switzerland | 464/74 |
| 413513 | 12/1966 | Switzerland | 464/74 |

Primary Examiner—Daniel P. Stodola
Assistant Examiner—William G. Battista, Jr.
Attorney, Agent, or Firm—John Russell Uren

[57] ABSTRACT

A cushion connector (10) used for above ground drilling has pin (11) and box (12) components at opposite ends. A housing (13) extends axially between the pin and box components. A drive spline (22) is operably connected to one of the components and extends outwardly from the axis (23) of the cushion connector (10). A plurality of drive blocks (24) extend inwardly from the inside diameter of the housing (13) and engage with keyways (69) of the drive spline (22). Drive lugs (71) connected to the inside of the housing (13) act on the drive blocks (24) and resilient cushion blocks (70). A spring (30, 60) extends between the pin (11) and box (12) components within the housing (13) and exerts axial force between them. The drive splines (22) are coaxial with the connector (10) and move axially under operation. Cushion blocks (70) are provided between the drive blocks (24) and drive lugs (71).

7 Claims, 4 Drawing Sheets

CUSHION CONNECTOR

This application is a continuation of U.S. patent application Ser. No. 07/680,518, filed Apr. 4, 1991, now abandoned.

INTRODUCTION

This invention relates to a cushion connector and, more particularly, to a cushion connector used for blast hole above ground drilling.

BACKGROUND OF THE INVENTION

Cushion connectors are used to cushion the shock created by the drill bit during drilling and passed through the drill string or drill steel to the drill head of the rig. Such cushion connectors are known and, in general, act to absorb the drilling shocks by moving so as to allow a certain amount of movement between the top of the drill string which is connected to the box end of the cushion connector and the drill drive head which is connected to the pin end of the cushion connector.

From that point of similarity, however, the tools act considerably differently and absorb the shock in a variety of different ways. In one connector, a resilient elastomeric material is inserted into the connector between the housing and the piston which moves relative to the housing and acts principally to absorb compression shocks which are passed from the drill bit to the drill drive head.

A problem with the use of elastomeric material as a compression absorber, however, is that the material inherently has a limited axial elasticity with the result that the stroke available in the connector is limited. It is desirable to have as long a stroke as possible in order to absorb the shocks from the drill bit with maximum efficiency.

A further disadvantage with known cushion connectors is that the drive splines do not act within the axial length of the springs. Rather, the springs are located above or below the drive splines. Such a configuration results in an increased axial length for the cushion connector which is undesirable when it is preferred to keep the axial length to a minimum for more convenient operating characteristics.

SUMMARY OF THE INVENTION

According to one aspect of the invention, there is provided a cushion connector comprising a pin component at one end of said connector, a box component at the opposite end of said connector, a housing extending between and connected to one of said pin and box components, a piston movable within said housing and connected to the other of said pin and box components, a drive spline extending outwardly from the axis of said piston, at least one drive lug extending inwardly from said housing, a drive block between said housing and said piston, and being engageable with said drive spline and a spring acting between said pin and box components, said drive spline being coaxial with said spring and operable to move axially within said drive blocks.

Further objects and advantages of the invention will become apparent from the description of a preferred embodiment of the invention below.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1A:
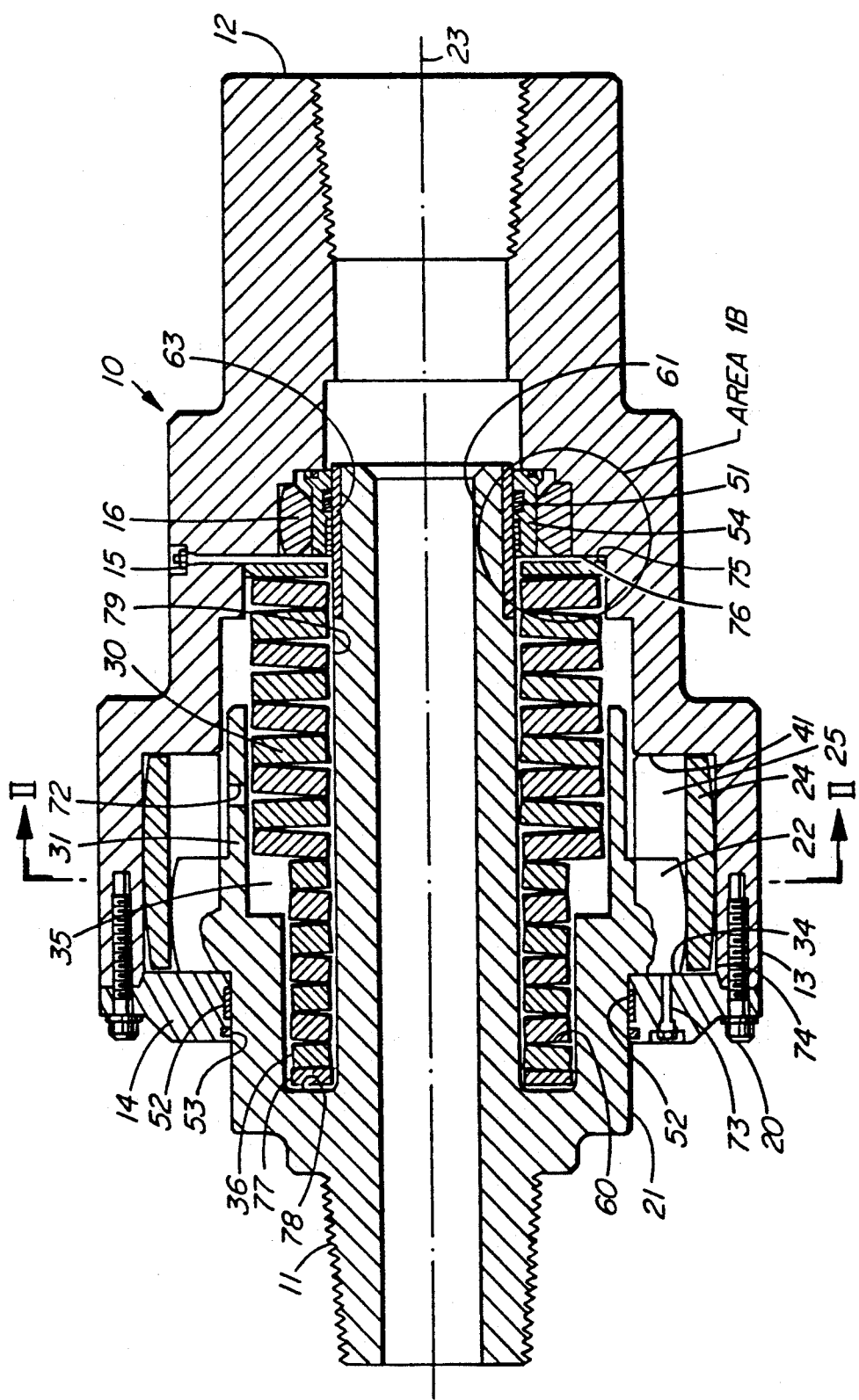
FIG. 1A is a sectional side view of the cushion connector according to the invention.
Figure 1B:
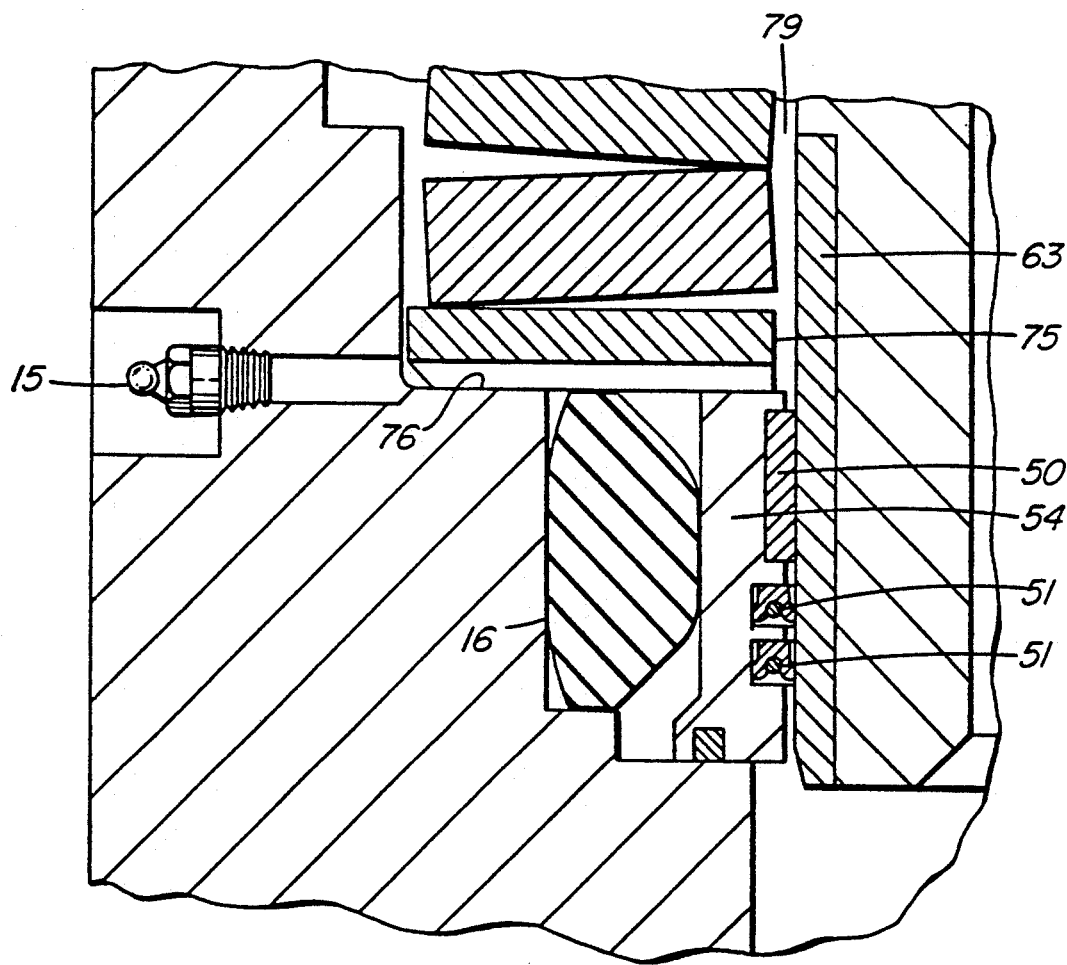
FIG. 1B is an enlarged partial view of Area 1B in FIG. 1A.

Reference is now made to the drawings and, in particular, to FIG. 1 where a cushion connector according to the invention is generally illustrated at 10. It comprises a pin component 11 at one end and a box component 12 located at the opposite end of the cushion connector 10.

Figure 2:
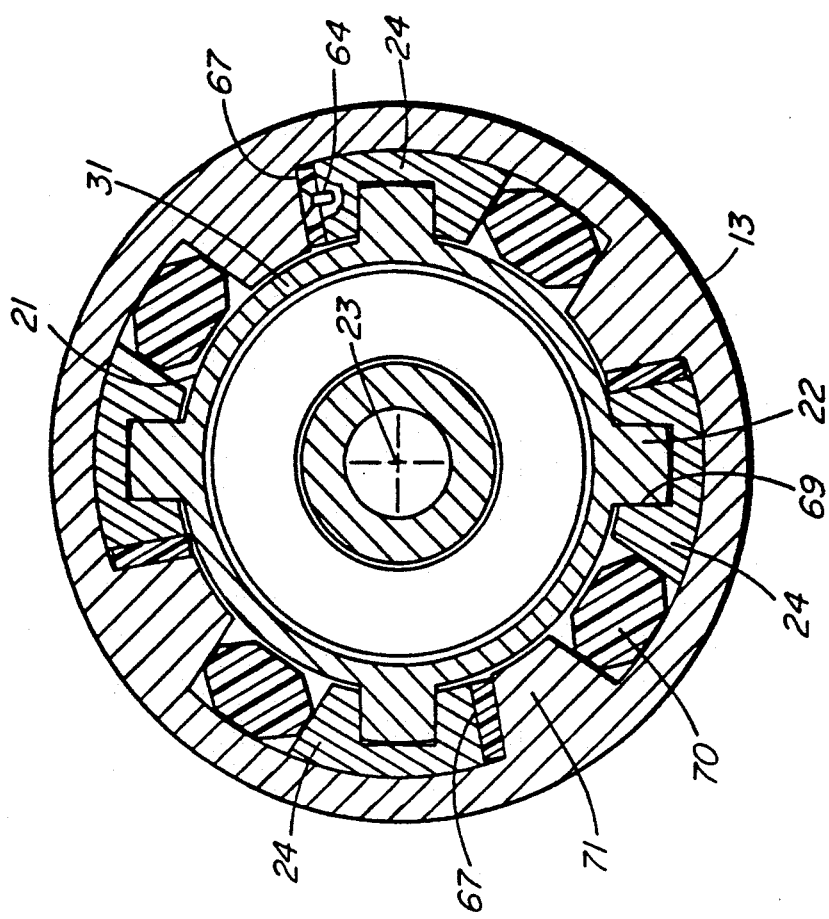
FIG. 2 is a sectional view taken along the plane II—II of FIG. 1.

A housing 13 extends axially from the box component 12 and a cap 14 is connected to the housing 13 on the pin end with cap screws 20 and is located about the periphery of the cap 14. A piston 21 extends from the pin component 11 and is movable with the pin component 11 relative to the housing 13 and box component 12. The annular space between the outer circumference of piston 21 and the inside of housing 13 forms a cavity 25. The piston 21 includes a plurality of drive splines 22 (FIG. 2) extending outwardly from the axis 23 of the piston 21, the drive splines 22 engaging with complementary drive blocks 24 and being movable relative thereto, the drive blocks 24 extending inwardly from the housing 13 as best seen in FIG. 2 and which have an arc shaped outer periphery as illustrated in FIG. 1. Two sets of Belleville or disc springs 30, 60, having different outside diameters, are mounted in a recess provided between the piston 21 and a skirt 31 in respective cylindrical recesses 35, 36. The two sets of disc springs 30, 60 extend between the pin component 11 and the box component 12 as is seen in FIG. 1. A first grooved ring 75 is mounted between the disc springs 30 and the inside surface 76 of the box compartment 12. Grooved ring 75 has a radially extending groove which allows grease to pass from the grease fitting 15 to the annular space 79 between the outside diameter of the extension 61 and the insider diameter of the disc springs 30. A second and similar grooved ring 77 is positioned between the disc springs 60 and the inside surface 78 of the pin end 11 to allow the grease to flow outwardly from annular space 79 into recess 36 and, thence, out hole 72 in skirt 31 and into the area of the drive block keyways 69, the drive spline 22 and the cushion blocks 70.

Piston 21 has an integral extension 61 which extends axially into the box component 12. Extension 61 maintains annular alignment between the pin and box components 11, 12, respectively, and is permitted a degree of radial movement by cushion 16 which is mounted within the box component 12 as illustrated.

The use of the disc springs 30 having a larger diameter than the diameter of disc springs 60 is permitted by the use of the skirt 31 which has a larger internal diameter at its end furthest removed from the pin component 11. The increased diameter of the second set of disc springs 30 allows a longer stroke over a given length which allows the cushion connector 10 to be shorter than otherwise would be required.

The axial movement of the pin component 11 relative to the box component 12 is limited by the drive splines 22. Skirt 31 has an additional function in preventing the migration of the cushion blocks 70 inwardly and away from their position between the drive lugs 71 and the drive blocks 24 as set out hereafter. A wear and corrosion resistant sleeve 63 is mounted about the distant periphery of the extension 61.

Guide rings 50 and wiper seals 51 are mounted on a ring 54 between the box component 12 and the extension 61 of piston 21. Likewise, a guide ring 52 and a wiper seal 53 are mounted between the cap 14 and the piston 21.

An elastomer back up cushion 67 (FIG. 2) is connected to each of the drive blocks 24 with screws 64. Elastomer cushion blocks 70 (also illustrated in FIG. 3) are mounted between each drive block 24 and the inwardly extending lugs 71 which are integral with housing 13. The cushion blocks 70 contact the faces of the drive blocks 24 and lugs 71 in a surface contacting area distributed over a significant quantity of the surface area of the face portion of both the drive blocks 24 and the lugs 71. The cushion blocks 70 and extend axially a distance within cavity 25 which is defined axially at one end 41 by an annular shoulder on the inside of the housing 13 and at the other end 34 by the inside of the cap 14. The cushion blocks 70 are compressed when the cushion connector 10 is assembled as will be described in greater detail.

High radial loads are imposed on the cover plate or cap 14 by the piston 21. This is so because it is contemplated that the interaction between the drill drive head (not shown) and the rotating drill steel (not shown) connected to the cushion connector 10 attempts to use the cushion connector 10 as a ball joint in an attempt to accommodate bent or flexing drill steel. Such radial loads will, therefore, act between cap 14 and housing 13 and tend to loosen the cap screws 20 with resulting damage to the mating surfaces.

To avoid or significantly reduce this condition, a conical type interference fit is provided between the cap 14 and the housing 13 in the area 74 (FIG. 1). The use of the cap screws 20 to pull the cap 14 axially into the housing 13 utilizing the interference fit between the two components results in a preload or residual force or stress which must be overcome. Thus, any relative movement between the cap 14 and the housing 13 will be significantly reduced or eliminated entirely with the result that the cap screws 20 will remain tightly fastened.

As the cap screws 20 are tightened, the cushion blocks 70 are compressed axially between the upper and lower surfaces 34, 41, respectively. This causes the cushion blocks 70 to expand at their girth to not only occupy the initial clearance space but to also be compressed between the lugs 71 and drive blocks 24.

OPERATION

The cushion connector 10 will be initially assembled by having the box component 12 in the lowermost position with the axis 23 of the cushion connector 10 being vertical. The housing 13 will be open with the cap 14 not yet being attached.

The cushion blocks 70 are of a dimension such that when they are positioned between the drive lugs 71 and the drive blocks 24, sufficient clearance is available to permit the drive blocks 24 to slide around the inside of housing 13 a limited angular amount such that the drive blocks 24 are free to align with and permit insertion of the drive splines 22 into the respective keyways 69 in the drive blocks 24.

The disc springs 30, 60 will then be positioned in recesses 35, 36.

The cap 14 which has guide ring 52 and the wiper seal 53 previously inserted is then fastened securely to the housing 13 using the cap screws 20.

The compression of the cushion blocks 70 will increase as the torque between the pin and box components 11, 12 is increased. Thus, the cushion blocks 70 achieve a preloaded coupling effect which transmits torque and reduces the torsional shock transmission from the drill string to the drill head as described further hereafter.

As referred to before, the fitting 15 is provided to allow for grease insertion for lubricating the cushion connector 10. The grease is routed through the fitting 15 and the radial groove in grooved ring 75 to recess 79 between the inside of the disc springs 30, 60 and the outside of the extension or wash pipe 61, through the groove in the grooved ring 77 into recess 35 and out through hole 72 into the drive block keyways 69 and spline sliding fit areas. The excess of the grease exits through relief fitting 73.

Figure 3:
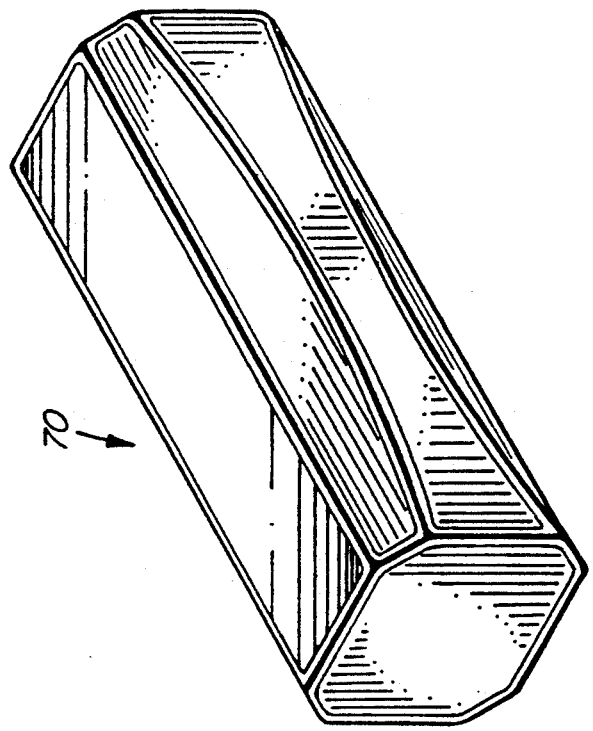
FIG. 3 is an isometric view of a single one of the cushion blocks.

The shape of the cushion blocks 70 is illustrated in FIG. 3. The width of the block 70 is greatest at its center point. This ensures that the initial contact area between the cushion blocks 70 separating the drive blocks 24 and the lugs 71 occurs over a small area when the cover plate 14 expands the girth of the cushion blocks 70 during assembly.

The thickness of each cushion block 70 corresponds over its length to the annular space between the outside diameter of piston 21 and the interior diameter of housing 13 and they are therefore prevented from expanding radially. When the elastomeric material from which the blocks 70 are made is compressed, the material will change in shape but not in volume. Since changes to the height and thickness of the cushion blocks 70 are limited by the surrounding metal parts of the connector 10, any change in shape to accommodate the reduced width, while maintaining a constant volume, must take place in the areas not confined by the metal and inflexible parts of the connector 10.

As compression of the blocks increases with increasing torque transmission by the connector 10 the area not confined by contact with the metal parts decreases and more compressive force is required to change the shape of the blocks. That is, the resistance of the blocks 70 to compression of their width increases at an escalating rate when compared to a unit amount of compression. The actual relationship is determined by the hardness of the elastomeric material from which the cushion blocks are made and the shape of the curved edges of the cushion blocks. Thus the rate of torsional stiffness increase of the connector can be determined by the material properties and shape of the cushion blocks 70.

The cushion connector 10 is then connected with the pin component 11 to the drill drive head (not illustrated) and the drill steel (not illustrated) is connected to the box component 12 of the cushion connector 10. Drilling now commences.

As the compression shocks created by the action of the drill bit on the ground formation are transferred through the drill steel, the cushion connector 10 will alternatively compress the springs and extend the springs 30, 60. The torsion created by the drill head on the pin component 11 of the cushion connector 10 will be transferred through the drive splines 22 to the drive blocks 24.

The torque will be transmitted by the drive blocks 24 to the cushion blocks 70 which will absorb the torsional excesses and distribute the torque more uniformly. The torque will then be transmitted to the lugs 71 of the housing 13 and thence to the drill steel through box component 12.

Figure 4:
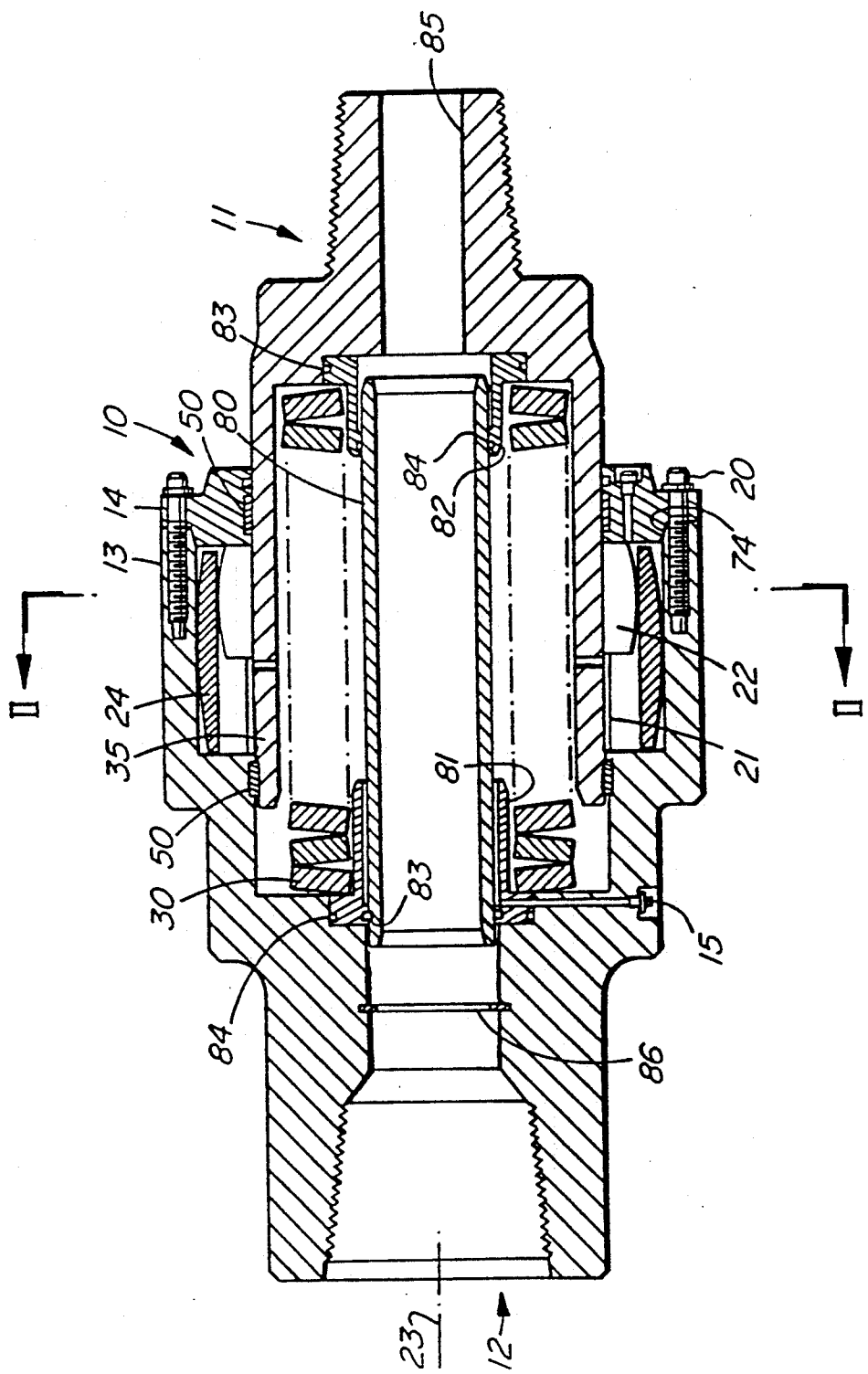
FIG. 4 is a sectional view of a further embodiment of the invention.

As compared to the FIG. 4 embodiment described hereafter, the FIG. 1 embodiment allows a larger diameter for some of the Belleville or disc springs. The springs 30, 60 have a common inside diameter and spring rate but the springs 30 have a larger outside diameter, being at a location which makes the increased volume available.

The larger diameter disc springs 30 provide a longer stroke per spring which allows the overall length of the cushion connector 1 to be shorter. The larger volume of spring material results in lower spring stresses and, hence, a longer fatigue life for the springs 30.

The extension or skirt 31 of piston 21 in FIG. 1 prevents the elastomer cushion blocks 70 from being deformed into the space beneath the end of the drive area and thereby interfering with the axial movement of the connector 10.

An additional embodiment of the cushion connector 10 according to the invention is illustrated in FIG. 4 wherein like numerals represent similar elements as those illustrated in the embodiment of FIGS. 1 and 2.

In this embodiment, the extension 61 of the FIG. 1 embodiment is replaced with a wear and corrosion resistant washpipe 80 which is not integral with either the pin or box components 11, 12 but which is, rather, a separate piece and which is mounted between two collars 81, 82, collar 81 being removably mounted within box component 12 and collar 82 being removably mounted within pin component 11. The washpipe 80 allows for limited angular movement between the pin and box components 11, 12 and is maintained in an axial position within the connector 1? by the reduced bore 85 of the pin component 11 and the retaining ring 86. The washpipe 80 can be removed without disassembly of the connector 10 by removing the retaining ring 86.

The outside diameter of the disc springs 30 in this embodiment are identical which is different from the springs 30, 60 of the FIG. 1 embodiment as earlier set out. This is so because the piston 21 must take some force resulting from angular misalignment between the box and pin components 12, 11, respectively, and, therefore, it being of a size having increased load bearing capacity with the result that there is a smaller inside diameter of the piston 21 available to house the disc springs 30.

Wiper rings 83, 84 are provided which act as seals between the collars 81, 82, the washpipe 80 and the pin and box components 11, 12.

It is contemplated that the cushion connector may readily be used for raise boring in addition to aboveground drilling. In this event, the teachings of the invention would apply.

Although the rings 83, 84 are illustrated in the FIG. 4 embodiment as being inserted in recesses in the collars 81, 82, it is contemplated that the rings 83, 84 could be mounted in the washpipe 80. In this event, the rings 83, 84 could be replaced by removing the washpipe 80 which can be conveniently accomplished by simply removing the retaining ring 86 and retrieving the washpipe 80 together with the rings 83, 84 from the box component 12 without otherwise disassembling the cushion connector 10.

Many further modifications to the apparatus described and illustrated will readily occur to those skilled in the art to which the invention relates and the specific embodiments set forth herein should be considered as illustrative of the invention only and not as limiting its scope as defined in accordance with the accompanying claims.

What is claimed is:

1. A cushion connector comprising a pin component at one end of said connector, a box component at the opposite end of said connector, a housing extending between and connected to one of said pin and box components, a piston movable within said housing and connected to the other of said pin and box components, an annular cavity outside of said piston and being defined axially at one end by an annular shoulder on the inside of said housing and at the other end by the inside of a cap connected to said housing and extending around the outside circumference of said piston, a drive spline extending outwardly from the axis of said piston into said cavity, at least one drive lug extending inwardly from said housing into said cavity, a drive block between said housing and said piston, said drive block being engageable and in contact with said drive spline, a cushion block positioned between and in contact with both of said drive lug and drive block, said cushion block being resilient and having an initial uncompressed length greater than the axial distance between said cap and said inside of said housing so as to assume an axially preloaded compression condition upon assembly of said cap to said housing, and a spring acting continuously between said pin and box components upon assembly of said pin and box components so as to continuously bias the pin component to separate from said box component, said drive spline being coaxial with and outside said spring, said drive spline being operable to move axially within said drive blocks relative to said cushion block.

2. A cushion connector as in claim 1 and further comprising a cap mounted to said housing between said housing and the outside diameter of said pin or box component.

3. A cushion connector as in claim 2 wherein said spring is a disc spring.

4. A cushion connector as in claim 3 wherein said drive block contacts said cushion block.

5. A cushion connector as in claim 4 wherein said drive spline is operably connected to said piston.

6. A cushion connector as in claim 1 wherein said drive spline extends outwardly from the axis of said piston at a position within the axial working area of said spring.

7. A cushion connector as in claim 6 wherein said drive spline has an inside diameter which is larger than the outside diameter of said spring.

* * * * *